United States Patent

[11] 3,584,963

| | | |
|---|---|---|
| [72] | Inventor | Daniel A. Wisner<br>North Adams, Mich. |
| [21] | Appl. No. | 787,465 |
| [22] | Filed | Dec. 27, 1968 |
| [45] | Patented | June 15, 1971 |
| [73] | Assignee | RCA Corporation |

[54] OPTICAL FLAW DETECTOR
6 Claims, 2 Drawing Figs.

[52] U.S. Cl. ............................................. 356/237,
250/219
[51] Int. Cl. ........................................... G01n 21/16
[50] Field of Search .................................... 356/237;
250/219 DF

[56] References Cited
UNITED STATES PATENTS

| | | | |
|---|---|---|---|
| 3,452,205 | 6/1969 | Bogholtz | 250/219 X |
| 3,430,055 | 2/1969 | Metzger | 356/237 X |
| 3,427,109 | 2/1969 | Beattie | 250/219 X (DF) |
| 2,719,235 | 9/1955 | Emerson | 356/200 X |

FOREIGN PATENTS

| | | | |
|---|---|---|---|
| 1,154,656 | 9/1963 | Germany | 250/219 |

Primary Examiner—Rodney D. Bennett, Jr.
Assistant Examiner—Joseph G. Baxter
Attorney—Edward J. Norton ABSTRACT: A sudden or a gradual change in the reflectivity to a light beam of adjacent portions of a surface of an article may indicate a flaw in the surface. The article which is to be detected for flaws is scanned by observing a light beam which is reflected from the surface of the article. The scanning means in effect passes onto the surface at one edge thereof and passes off at the opposite edge. The sudden changes in reflectivity of the surface as the scanning means passes onto the surface or departs from it during scanning is prevented from acting to indicate a flaw or from causing a gradual change indicator to give a false indication of a flaw.

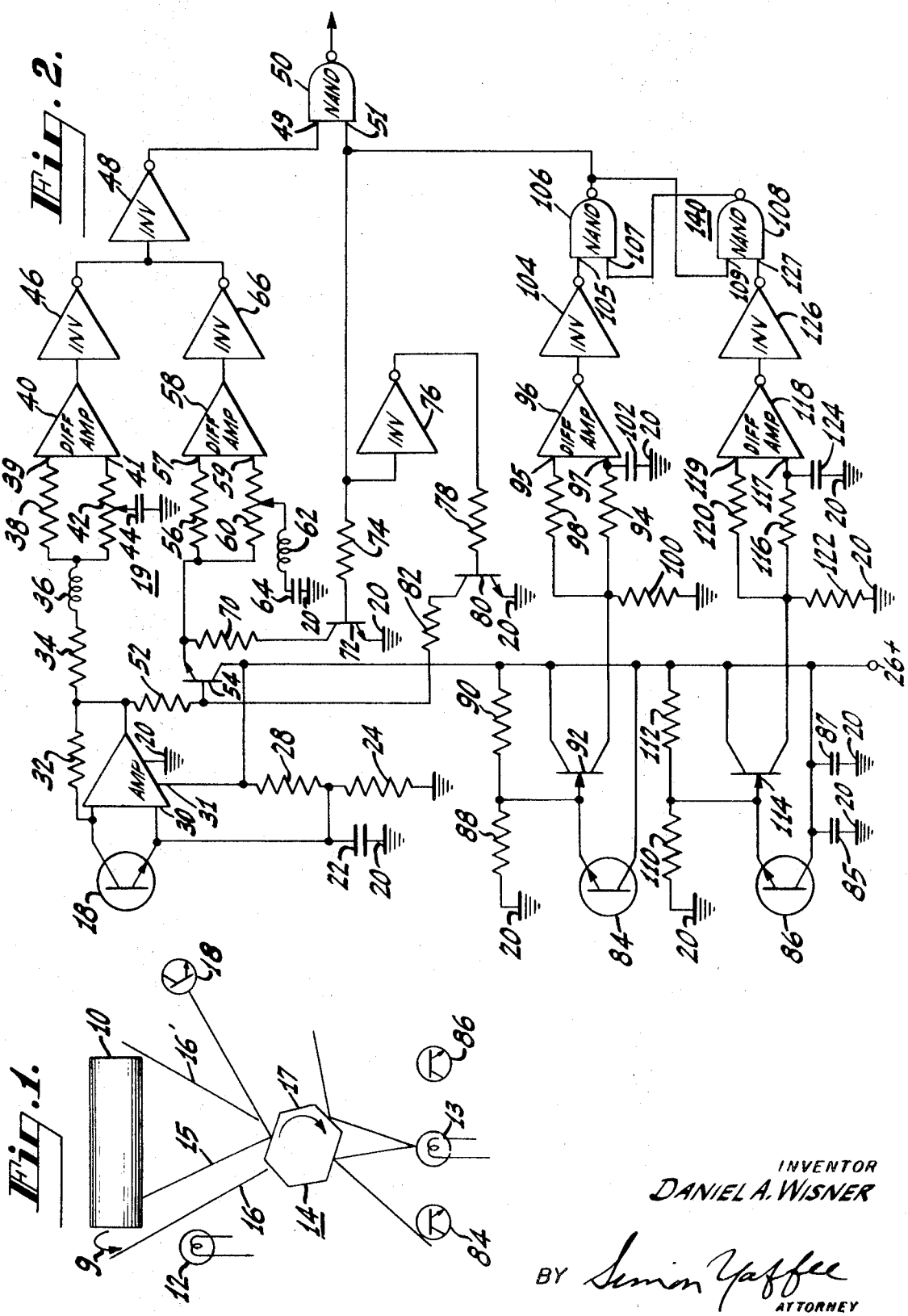

OPTICAL FLAW DETECTOR

This invention relates to an apparatus of the optical-type for detecting a flaw in an article.

The surface of an article to be tested may be illuminated and the light reflected from the surface may be scanned in a linear manner by a light sensitive means. The surface is moved during scanning, the scanner and the motion of the article being so coordinated that the complete surface of the article is scanned. If the surface of the article has unvarying reflectivity from point to point, there will be no variation in the amount of light reflected by the article and the surface of the article is presumed to be perfect. Variations in the reflectivity of different portions of the surface of the article may indicate imperfections that are within acceptable limits, while greater variations in reflectivity may indicate imperfections or flaws that are not within acceptable limits. However, for complete scan of the surface of the article, the scanning device will go on to the article at one end of the scanning line and will go off the article at the other end of the scanning line. At the instant that the scanning device reaches the article and at the instant that the scanning device leaves the article, the amount of light reflected will change greatly, yet there is no flaw. Therefore, false indication of a flaw would be given twice in each scan line.

Furthermore, gradual change in reflectivity of a surface may indicate gradual deterioration of the surface. If a voltage corresponding to the average reflectivity during a complete scan is compared with the average reflectivity during another complete scan, the changes in reflected-light when the scanning device is off the article will vary a voltage corresponding to the average reflectivity, whereby the flaw detector may not provide correct indication of a flaw that manifests itself as a gradual change of reflectivity. Therefore, automatic flaw indicators may indicate a flaw in the article even though the article be flawless.

It is an object of this invention to provide an improved flaw detector of the optical-type which compensates for incorrect flaw indication due to the scanner leaving the article.

In accordance with this invention, the scanned light beam which is reflected from an article to be examined for flaws is applied to a means which detects and indicates sudden changes of reflected light, which indicate that closely adjacent portions of the article exhibit relatively great difference of reflectivity and that a bad spot exists on the surface of the article, and which also detects gradual changes of reflected light, which indicates that the reflectivity of the surface is changing gradually and that the quality of the surface of the article is therefore also changing gradually. Means are provided whereby the great change in reflected light as the light scanner passes on and off the article during scanning does not cause false indication either of localized flaws or of the gradual deterioration type of flaws.

The invention may be better understood upon reading the following description in connection with the accompanying drawing in which:

FIG. 1 is a diagrammatic showing of means for optically scanning a cylindrical surface of an article; and FIG. 2 is a circuit diagram of a flaw detector according to an embodiment of this invention.

Turning to FIG. 1, the surfaces of the article 10, which may be a cylindrical roller to be incorporated in a roller bearing, is to be checked for flaws. The article 10 is mounted for rotation about its axis as indicated by the curved arrow 9. Light from a light source 12 is projecting by means not shown onto the whole surface of the article 10. A scanner 14 of any suitable type which accepts a small pencil-shaped light beam 15 that is reflected from the surface of the article 10 is provided, the beam 15 oscillating between two extreme positions 16 and 16' The scanner 14, which may include a hexagonal mirror 17, scans the light reflected from a straight linear portion of the roller from end to end. To be sure that the complete surface of the article 10 is scanned, the scanner scans all the light in the angle between the lines 16 and 16'whereby, due to the rotation of the mirror 17 the scanner passes or runs onto one end of the article (the left end as viewed in FIG. 1) and runs off of the other end of the article (the right end as viewed in FIG. 1). Since the roller 10 is rotating about its axis, the whole surface of the roller is scanned. The reflected beam 15 is applied to a photocell 18 comprising an element of the flaw detector 19 of FIG. 2. An additional light 13 is provided which is caused to shine on one of two photocells 84 or 86, which also comprise part of the flaw detector 19 or on neither thereof due to the rotation of the mirror 17. The arrangement is such that only the photocell 84 is exposed to the light 13 as the beam 15 runs on the article 10 at the left end and until the beam 15 has just passed the edge of the article 10 during the scan. Furthermore, only the photocell 86 is exposed to the light 13 during a period starting just before the beam 15 leaves the other end of the article 10 and until the beam 15 passes off the article on its way to its other extreme position 16'. The beam 15 then disappears and reappears again at the position 16 to repeat the scan. While a particular scanning means is shown by way of example, any suitable means may be used. No further explanation of the details thereof appears necessary.

The circuit diagram of the flaw detector 19 is shown in FIG. 2. As noted above, the photocell 18, which may be of silicon-type, is exposed to the beam reflected from the article 10. The anode of the photocell 18 is connected to one of the two input terminals, the upper one as shown in FIG. 2, of an amplifier 30. Operating potential is applied to the terminal 31 of the amplifier 30 from a positive terminal 26 of a source of potential, not shown, this operating potential being applied through the amplifier 30 to the anode of the photocell 18. The cathode of the photocell 18 is connected to ground 20 by way of a filter capacitor 22 and resistor 24 in parallel. The cathode of the photocell 18 is also connected to the other input terminal of the amplifier 30 and to the positive terminal 26 of the source of potential through a resistor 28. The resistors 24 and 28 act as a potentiometer, whereby a desired portion of the voltage connected to the terminal 26 is applied between the the anode and cathode of the photo cell 18. The capacitor 22 acts to keep the voltage on the cathode of the photocell 18 constant. Variations in illumination of the photocell 18 causes the application of a variable signal voltage to the amplifier 30. A resistor 32 is connected between the input and the output terminal of the amplifier 30 whereby a high gain operational amplifier is provided. The ground terminal of the amplifier 30 is connected to ground 20.

The output terminal of the operational amplifier 30 is connected by way of a resistor 34, an inductor 36 and a second resistor 38 connected in the order named to one terminal 39 of a differential amplifier 40. The resistor 34 and the inductor 36 are provided to prevent undesired oscillations of the circuit to be described. A potentiometer resistor 42 is connected between the junction of the inductor 36 and the resistor 38 to the other terminal 41 of the differential amplifier 40. The slider of the potentiometer 42 is connected to ground 20 through a capacitor 44. The output terminal of the amplifier 40 is connected by way of two inverters 46 and 48 in cascade to one input terminal 49 of a NAND circuit (hereinafter NAND) 50. As will be explained, quick changes of reflectivity of the surface of the article are detected by the differential amplifier 40.

The output terminal of the operational amplifier 20 is also connected by way of a resistor 52 to the base of a NPN transistor 54. The emitter of the transistor 54 is connected by way of a resistor 56 to one input terminal 57 of a differential amplifier 58, and by way of a potentiometer resistor 60 to the other input terminal 59 of the differential amplifier 58. The slider of the resistor 60 is connected to ground 20 by way of an inductor 62 and a capacitor 64 in series. The differential amplifier 58 detects slow changes in reflectivity of the surface of the article 10. The output of the amplifier 58 is connected by way of an inverter 66 and the inverter 48 in cascade to the one input terminal 49 of the NAND 50. The output of the NAND 50 indicates a flaw which causes either quick changes in the reflectivity of the surface from point to point or which causes slow changes in reflectivity of portions of the surface of the article. The emitter of the transistor 54 is also connected by way of a resistor 70 to the collector of an NPN transistor 72. The collector of the transistor 54 is directly connected to the power supply 26.

The emitter of the transistor 72 is connected to ground 20. The base of the transistor 72 is connected by way of a resistor 74 to the other input terminal 51 of the NAND 50.

The other input terminal 51 of the NAND is connected by way of an inverter 76 and a resistor 78 in cascade to the base of an NPN transistor 80. The emitter of the transistor 80 is connected to ground 20 and the collector of the transistor 80 is connected by way of a resistor 82 to the base of the transistor 54. The transistor 72 and 80 and their circuits act to prevent changing the average voltage retained in the capacitor 64 and corresponding to an average reflectivity for a line or portion thereof from being changed when the beam 15 is off the article 10 and as the beam 15 in its scan enters or leaves the object 10.

Two additional silicon photocells 84 and 86 are provided. The photocell 84 and its circuit senses when the beam 15 enters on the surface of the article 10 while the photocell 86 and its circuit senses when the beam 15 leaves the article 10. The anode of the photocell 84 is directly connected to the supply terminals 26. The cathode of the photocell 84 is connected to the junction of the two resistor 88 and 90 which are connected between the source 26 and ground 20. The cathode of the photocell 84 is also connected to the gate of a N channel deletion type field effect transistor 92. The drain of the transistor 92 is connected to the supply terminal 26 and the source of the transistor 92 is connected by way of a resistor 98 to one input terminal 95 of a differential amplifier 96 and by way of a resistor 94 to the other input terminal 97 of the amplifier 96. The source of the transistor 92 is also connected to ground by way of a load resistor 100. A storage capacitor 102 is connected between the input terminal 97 of the amplifier 96 and ground 20. The output terminal of the amplifier 96 is connected by way of an inverter 104 to one terminal 105 of a NAND 106. The other input terminal 107 of the NAND 106 is connected to the output terminal of another NAND 108. The output terminal of the NAND 106 is connected both to an input terminal 109 of the NAND 106 and to the input terminal 51 of the NAND 50. The NANDS 106 and 108 comprise a bistable flip flop circuit (hereinafter F-F) 140.

The anode of the photocell 86 is connected to the supply terminal 26 and also to ground 20 by way of two filter capacitors 85 and 87 connected in parallel. If convenient, one filter capacitor may be substituted for the capacitor 85 and 86. The cathode of the photocell 86 is connected to the junction of two resistors 110 and 112 which are connected between the terminal 26 and ground. The cathode of the photocell 86 is also connected to the gate of a N channel depletion type field effect transistor 114 whose drain is connected to the supply terminal 26 and whose source is connected through a resistor 116 to an input terminal 117 of a differential 118 and through a resistor 120 to the other input terminal 119 of the amplifier 118. The source of the transistor 114 is also connected by way of a load resistor 122 to ground 20. A capacitor 124 is connected between the terminal 117 and ground 20. The output terminal of the amplifier 118 is connected by way of an inverter 126 to the other input terminal 127 of the NAND 108.

The reflected beam of light 15 selected by the scanner 14 is applied to the photocell 18. The two photocells 84 and 86, as will be explained prevent false indication by the photo indicator 19 before the beam 15 arrives at and after the beam 15 leaves the opposite edges of the article 10. The operation of the photodetector will be explained at this point as if the photocells 84 and 86 and their cooperating circuits were omitted.

Variations in resistance of the photocell 18 due to variations (if any) in the light beam 15 applied thereto will be applied as a variation in voltage between the input terminals of the operational amplifier 30. The voltage change appearing at the output of the operational amplifier is applied substantially instantaneously and substantially without change by way of the resistor 34 and the inductor 36 and the resistor 38 to one terminal 39 of the differential amplifier 40, and this voltage is also applied by way of the resistor 34 the inductor 36 and the potentiometer resistor 42 to the other input terminal 41 of the differential amplifier 40. If there is no change of voltage from moment to moment due to change of reflected light applied to the photocell 18 during the scan, the voltages applied to the two input terminals 39 and 41 of the differential amplifier 40 are the same and there is no output therefrom. If the voltage at the output of the differential amplifier 30 changes rapidly as due to the detection of a dark spot or a bright spot on the surface of the article which indicates a flaw in the surface of the article 10, the voltage change will be applied immediately to the input terminal 39 of the differential amplifier by the resistor 38 will be delayed in its application to the other input terminal 41 of the differential amplifier 40 to which the resistor 42 is connected by the action of the capacitor 44, whereby a positive going voltage appears at the output of the amplifier 40, it being noted that the differential amplifier 40 is adjusted to provide a positive output whether the voltage applied to the terminal 39 is greater or less than the voltage applied to the terminal 41. By adjustment of the position of the slider on the resistor 42, the time constant of the circuit comprising a portion of the resistor 42 and the capacitor 44 can be adjusted so that minor changes in reflected light will cause no substantial difference in the voltage applied to the input terminals 39 and 41, whereby the sensitivity of the flaw detector to minor sudden changes of reflectivity may be adjusted.

The output of the differential amplifier 40 becomes high when a flaw is detected whereby a high voltage is applied to the input 49 of the NAND 50 by the action of the two inverters 46 and 48. If the input terminal 51 of the NAND is high or positive due to its connection to the F-F 140 comprising the NANDS 106 and 108, the output of the NAND 50 will go low whereby an indication will be provided at the output of the NAND 50 that there is a flaw in the article 10.

If the change in voltage at the output of the operational amplifier is gradual, due to a gradual deterioration of the surface of the article 10 as may be caused by a brightly polished portion of the surface thereof gradually merging into a dull area or vice versa, the time constant of the capacitor 44 and the resistor 42 is not such as to cause a difference in voltage between the two input terminals of the differential amplifier 40. That is, for slow changes in voltage applied to the joined ends of the two resistors 38 and 42, the voltages at the terminals 39 and 41 will remain the same. As stated above, the degree of slowness that is not detected by the differential amplifier 40 may be chosen by moving the slider of the potentiometer 42 along the potentiometer resistor.

Slow changes in reflectivity are detected by the differential amplifier 58. The voltage at the output of the operational amplifier 30 is applied by way of the resistor 52 and the base to emitter path of the transistor 54 and two resistors 56 and 60 to the two input terminals 57 and 59 of the differential amplifier 58. Quick changes in voltage do not affect the charge on the capacitor 64 due to the action of the inductor 62. However, a steady voltage corresponding to the average over the period of the scan of one line (for example), which appears at the output terminal of the operational amplifier 30, is stored in the storage capacitor 64, whereby the voltage across the capacitor 64 is a measure of the average brightness of a portion of the scan by the beam 15. By adjustment of the position of the slider on the potentiometer 60, the voltage stored on the capacitor 64 may be a measure of the average brightness of a scanning line, as distinct from a smaller or larger portion, of the surface of the article, whereby the differential amplifier 58 compares the average brightness of the successively scanned lines of the surface of the article 10. If the voltage applied to the joined ends of the resistors 56 and 60 varies suddenly, the voltages at the terminals 57 and 59 vary together and there is no voltage difference between them. However, if the voltage applied to the joined ends of the resistors 56 and 60 varies gradually, then the voltage of the terminal 57 varies with respect to the voltage at the terminal 59 whereby the differential amplifier 58 notes a gradual change in reflectivity of the surface of the article 10 by providing a high or positive voltage at its output terminal. A high is applied to the terminal 49 of the NAND 50 and if the voltage applied to the terminal 51 of the NAND 50 is also high, a low appears at the output of the NAND 50 indicating a flaw. Three inverters 46, 66 and 48 are used in the connection described so that the outputs of the differential amplifiers 40 and 58 do not affect each other.

It will be understood that there must be no indication of a flaw while, during the scanning operation, the light beam 15 is off the article or while the light beam 15 is passing over the edge of the article either on its way off or on its way onto the article, nor should the voltage corresponding to the average reflectivity of the line of the article 10 as stored in the capacitor 64 be changed by the light that is reflected from the background when the scanning beam 15 is off the article 10 or at the moment the beam passes the edge of the article 10. Such indications of flaws and changing average voltage are prevented by the photocells 84 and 86 and their connections.

The two NANDS 106 and 108 are so connected as to comprise a bistable F-F 140. A negative voltage or ground on input terminal 105 of the NAND 106 changes the output terminal of the NAND 106 to high or positive while a high or positive voltage applied to the terminal 105 does not change the output of the NAND 106. Similarly, a negative or ground voltage applied to the input terminal 127 of the NAND 108 changes its output voltage to high and therefore the output voltage of the NAND 106 to low, but a high or positive voltage applied to the input terminal 127 of the NAND 108 causes no change in its output voltage.

Just before the beam 15 goes off the article 10 on the right as viewed in FIG. 1 the cell 86 is illuminated by the light 13, (the cell 84 not being illuminated), by action of the rotating mirror 17. The output of the photocell 86 goes high and the output of the cell 84 stays low. The output of the differential amplifier 118 goes high due to the change of output voltage of the photocell 86. This high causes a low to be applied to the input terminal 127 of the NAND 108 whereby the output of the NAND 106 goes low. The voltage applied to the input terminal 51 of the NAND 50 is therefore also low or negative and the output of the NAND 50 remains high. Therefore, no matter what the input to the terminal 49 of the NAND 50, the output thereof remains high and there can be no flaw signal from the moment just before the beam 15 leaves the article towards the right. As the mirror 17 continues to rotate, light from the lamp 13 no longer hits the photocell 86, causing another negative voltage to be applied to the input terminal 127 but there is no effect on the F-F 140 thereby since the output of the NAND 106 is already low.

The light from the source 13 hits the photocell 84 just after the beam 15 passes the right end of the article in the scan of the beam 15 from left to right, causing different voltages to be applied to the two input terminals of the differential amplifier 96 whereby a negative is applied to the terminal 105 of the NAND 106 causing a positive to be applied to the 51 input of the NAND 50. Therefore, during a period starting an instant just before the beam 15 crosses the right end of the article 10 to the instant just after the beam 15 crosses the left edge of the article 10, negative is applied to the 51 input of the NAND 50 and there can be no indication of a flow during this period. During the time when the beam is scanning the remainder of the surface of the article 10, the input 51 of the NAND 50 is high and flaw indications (if there be any) that are applied at the input terminal 49 get through to the output terminal of the NAND 50.

Therefore, while the beam 15 is off the article 10 in either direction or while the beam 15 is passing over the edges of the article, the output of the F-F 140 appearing at the output terminal of the NAND 106 is low and no flaw signals can be provided as explained above. Furthermore, when the beam is off the article 10 or just passing over its edge, the voltage stored on the capacitor 64, which is a measure of the average brightness of the last line that has been scanned, is prevented from changing. This is accomplished as follows.

When the output of the NAND 106 is low, the voltage applied to the base of the transistor 72 is low and the transistor 72 is nonconductive, disconnecting the resistor 70 from ground rendering the transistor 54 nonconductive whereby no signal can be applied to the capacitor 64 during the time the beam 15 is off the article 10. Furthermore, when the output of the NAND 106 is low, the voltage applied to the base of the transistor 80 is high, making the transistor 80 conductive and shunting any voltage applied to the base of the transistor 54 away from the base of the transistor 54 as additional assurance that the capacitor 64 is not discharged through the transistor 54 and that the signal applied to the base of the transistor 54 does not arrive at the capacitor 64 during the time that the beam 15 is off or is passing over the edge of the article 10. In this manner, the average voltage stored in the capacitor 64 is not changed while the beam 15 is off the article 10 or is passing over its edges.

However, when the output of the NAND 106 is high or positive, the transistor 72 is conductive whereby the resistor 70 acts as a load for the transistor 54, and also the transistor 80 is nonconductive whereby the signal appearing at the output of the operational amplifier 30 is not shunted away from the base of the transistor 54. Therefore, the differential amplifier 58 is sensitive to slow changes in the beam 15 due to successive scanning of lines of the article 10 but does not give false indication due to the variations in the beam 15 when it is off the article or when it is just passing across the edge of the article.

What I claim is:
1. In a device for testing the reflectivity of a surface of an article,
   means for illuminating the article the surface reflectivity of which is to be tested,
   means for scanning said illuminated surface to produce an electrical signal according to said surface reflectivity, said scanning means selecting beams which are reflected from said surface and also beams which are not reflected from said surface,
   means for indicating sudden changes in said electrical signal,
   means for indicating slow changes in said signal by averaging said signal over a predetermined period,
   means for preventing change in said average during the period when said scanning means selects beams that are not reflected from said surface, and
   means responsive to said indications for providing test information.

2. The invention as expressed in claim 1 in which said indication preventing means also prevents changes in averaging during the period when said scanning means selects beams that are reflected by the edge of said illuminated surface.

3. A test instrument responsive to condition changes comprising
   a condition change sensing means, said change sensing means providing an electrical signal which is a measure of the change in said condition,
   means to provide a second signal when said electrical signal changes suddenly,
   means for providing a third signal when said electrical signal changes gradually,
   means responsive to the occurrence of said second and third signal to provide an indication, and
   means operative during a predetermined period of operation of said condition sensing means and of said second and third signal providing means to prevent occurrence of said indication, said means to provide said third signal including a voltage averaging means and in which said means to prevent said indication includes means to prevent changes in the voltage provided by said voltage averaging means during said predetermined period.

4. A test instrument comprising a photocell, means for scanning the light beams reflected from the surface of an article to be tested and for applying said light beams to said photocell whereby said photocell produces a voltage which corresponds to the light beam applied thereto, means for applying said voltage to one point on each of two circuit paths, one of said circuit paths having a different time constant than the other of said circuit paths, and means for comparing the voltage at other points on said circuit paths whereby an output signal is produced when the voltage applied to said one point changes, one of said circuit paths including a voltage averaging means, and in which means are included for preventing the voltage provided by said voltage averaging means from being varied of a quickly varying signal to said one circuit path.

5. The invention as expressed in claim 4 in which means are provided to prevent said averaging means from changing its average during a portion of said scan.

6. In a device for testing the reflectivity of a surface of an article, means for illuminating the article the surface reflectivity of which is to be tested, means for scanning said illuminated surface to produce an electrical signal according to said surface reflectivity, said scanning means selecting beams which are reflected from said surface and also beams which are not reflected from said surface, means for indicating sudden changes in said electrical signal, means for indicating slow changes in said signal by averaging said signal over a predetermined period, means to prevent indication during the period when said scanning means selects beams that are not reflected from said surface, said indication preventing means including means to prevent change in said averaging during the period when said scanning means selects beams that are not reflected from said surface, and means responsive to said indications for providing test information.